United States Patent
Huang

(10) Patent No.: US 9,317,277 B2
(45) Date of Patent: Apr. 19, 2016

(54) TIRE PRESSURE SENSOR

(71) Applicant: SUNG JUNG MINUTE INDUSTRY CO., LTD., Hsinchu County (TW)

(72) Inventor: Wen-Huo Huang, Hsinchu County (TW)

(73) Assignee: SUNG JUNG MINUTE INDUSTRY CO., LTD, Hsinchu County (TW)

(*) Notice: Subject to any disclaimer, the term of this patent is extended or adjusted under 35 U.S.C. 154(b) by 281 days.

(21) Appl. No.: 14/044,187

(22) Filed: Oct. 2, 2013

(65) Prior Publication Data

US 2015/0091719 A1  Apr. 2, 2015

(51) Int. Cl.
*B60C 23/00* (2006.01)
*G06F 9/445* (2006.01)
*B60C 23/04* (2006.01)

(52) U.S. Cl.
CPC .............. *G06F 8/65* (2013.01); *B60C 23/0494* (2013.01)

(58) Field of Classification Search
USPC ........................................................ 340/442
See application file for complete search history.

(56) References Cited

U.S. PATENT DOCUMENTS

| | | | | |
|---|---|---|---|---|
| 2003/0227379 A1* | 12/2003 | Itou | ..................... | B60C 23/0416 340/442 |
| 2008/0164846 A1* | 7/2008 | DeKeuster | .............. | B60C 23/04 320/115 |
| 2008/0258893 A1* | 10/2008 | Huang | ................ | B60C 23/0408 340/442 |
| 2008/0302425 A1* | 12/2008 | Hettle | ................. | B60C 23/0408 137/227 |
| 2011/0192221 A1* | 8/2011 | Wang | ................... | B60C 23/0408 73/146.8 |
| 2012/0017672 A1* | 1/2012 | Uh | ....................... | B60C 23/0494 73/146.8 |
| 2012/0312089 A1* | 12/2012 | Li | ....................... | B60C 23/0452 73/146.5 |
| 2013/0009762 A1* | 1/2013 | Yu | ....................... | B60C 23/0494 340/442 |
| 2014/0116126 A1* | 5/2014 | Rothstein | ............ | B60C 23/0408 73/146 |
| 2015/0015387 A1* | 1/2015 | McIntyre | ............ | B60C 23/0471 340/447 |
| 2015/0029016 A1* | 1/2015 | Lesesky | ................ | B60C 23/045 340/442 |

FOREIGN PATENT DOCUMENTS

| | | |
|---|---|---|
| TW | I332559 B | 11/2010 |
| TW | M405977 | 6/2011 |
| TW | M419917 U | 1/2012 |

* cited by examiner

*Primary Examiner* — Naomi Small
(74) *Attorney, Agent, or Firm* — Muncy, Geissler, Olds & Lowe, P.C.

(57) ABSTRACT

A tire pressure sensor is installed on a tire rim which includes an assembly through hole. The tire pressure sensor includes a sensor body, a gas intake nozzle fixed on the tire rim and connected to the sensor body, and a gas nozzle assembly member to couple with the sensor body and the gas intake nozzle. The sensor body includes a gas nozzle assembly hole to couple with the gas intake nozzle, a tire pressure sensing module disposed in the sensor body for detecting a tire pressure, and an update connection port electrically connected to the tire pressure sensing module. Through the update connection port, the tire pressure sensing module receives an update firmware data for updating firmware stored therein in response to different applications.

6 Claims, 5 Drawing Sheets

TIRE PRESSURE SENSOR

FIELD OF THE INVENTION

The present invention relates to a tire pressure sensor, and more particular to a tire pressure sensor that is capable of firmware update.

BACKGROUND OF THE INVENTION

Driving safety is the primary consideration for a driver when driving and travelling on the road. The tire pressure is one of key factors of vehicle conditions, and has a critical influence on driving safety. A vehicle can run smoothly only with a normal tire pressure. An excessive or insufficient tire pressure may result in a punctured tire or a flat tire, which severely jeopardizes driving safety and even threatens the safety and wellbeing of passersby. Needless to say, monitoring a tire pressure for ensuring driving safety must be attended with great importance. A conventional method for measuring a tire pressure can only be performed for a still vehicle, and changes of the tire pressure for a driving vehicle cannot be detected in real-time. That is, a driver may not immediately learn about abnormalities in a tire during driving, and may not accordingly take appropriate actions in the event of the abnormalities.

To better and more conveniently detect a tire pressure, various tire pressure detection devices, which can be installed to a tire, have been developed by associated manufacturers to enable a driver to learn about the changes of the tire pressure in real-time. A built-in tire pressure detector is directly installed inside a tire, and features advantages of high detection accuracy, anti-theft and can be directly pumped. The Taiwan Patent Nos. I332559, M405977 and M419917 disclose such built-in tire pressure detector. The built-in tire pressure detector includes a detector body and a gas nozzle. The gas nozzle is penetrated and fastened onto an opening of a tire rim, and the detector body is fastened to the gas nozzle by a connecting member such as a screw, a screw bolt or a screw nut. Conditions of the tire are then wirelessly transmitted to a receiver installed on the vehicle, so as to enable a driver to monitor whether there are abnormal tire conditions.

Conventional tire pressure detectors are not unified by standardized specifications, and data formats adopted by different manufacturers are also different. Further, among different vehicle models correspondingly appropriate tire pressures may be different, so that tire pressure detectors have different settings to adapt different vehicle models. As a result, tire pressure detectors, manufactured by different manufacturers or suitable for different vehicle models, cannot be interchangeably used. Moreover, a built-in tire pressure detector is disposed in a high-pressure and high-rotational speed tire, which is an extremely harsh operating environment for electronic components of the built-in tire pressure detector. Therefore, conventional built-in tire pressure detectors request for a high level of air tightness for preventing damages caused by dust or moisture, and thus most market available built-in tire pressure detectors include sealed structure that cannot be disassembled. Since firmware settings of the electronic components in a sealed housing of such conventional built-in tire pressure detector cannot be updated to adapt to different vehicle models, applications of the conventional tire pressure detectors are quite limited. For a driver, when replacing an old vehicle with a new one, as an old tire pressure detector is inapplicable for the new vehicle, a new tire pressure detector at an additional expense for the new vehicle may be disturbing. For a manufacturer, when manufacturing a tire pressure detector, electronic components of the tire pressure detector need to be first written with firmware and then assembled with a housing. That is to say, several production lines need to be provided in order to manufacture tire pressure detectors corresponding to several vehicle models, such that production costs are increased. Further, since the housing of the tire pressure detector cannot be dissembled, the above production method may not in time make appropriate adjustments in response to drastic changes in market demands for tire pressure detectors, which may induce an inventory issue for the manufacturer.

SUMMARY OF THE INVENTION

Therefore the primary object of the present invention is to provide a tire pressure sensor capable of firmware update to adapt to applications of different vehicles.

To achieve the above object, a tire pressure sensor is provided. The tire pressure sensor, which is installed on a tire rim including an assembly hole, includes a sensor body, a gas intake nozzle connected to the sensor body, and a gas nozzle assembly member for coupling with the sensor body and the gas intake nozzle. The sensor body includes a gas nozzle assembly hole, a tire pressure sensing module, and an update connection port. The tire pressure sensing module is disposed in the sensor body for detecting a tire pressure, and includes a control unit which saves a firmware for controlling operation of the tire pressure sensing module. The update connection port is electrically connecting to the tire pressure sensing module, and transmits an update firmware data to the control unit of the tire pressure sensing module for updating the firmware. The gas intake nozzle includes a coupling section and a gas intake section. The coupling section is inserted into the gas nozzle assembly hole. The gas intake section is connecting to the coupling section, and penetrates through the assembly through hole to extend towards a direction outside the tire rim for gas to input.

In one embodiment, the sensor body comprises a first housing including an accommodating chamber to accommodate the tire pressure sensing module, and a second housing engaging with the first housing to enclose the accommodating chamber.

In one embodiment, the second housing includes at least one perforation, and the update connection port includes at least conducting pin disposed in the accommodating chamber and corresponding to the perforation to transmit the update firmware data form outside to the control unit.

In one embodiment, the control unit includes a sensing region. The sensor body includes a gas intake portion corresponding to the sensing region, and a washer disposed between the gas intake portion and the sensing region.

In one embodiment, the coupling section further includes an assembly hole and a positioning groove. The assembly hole of the coupling section is disposed facing the gas nozzle assembly hole to couple with the gas nozzle assembly member. The positioning groove is for engaging with the assembly through hole of the tire rim to fasten the gas intake nozzle onto the tire rim.

In one embodiment, the sensor body further includes an electromagnetic wave transmission element. The electromagnetic wave transmission element is electrically connected to the tire pressure sensing module to output a tire condition information generated by the tire pressure sensing module after detecting the tire pressure.

In one embodiment, the electromagnetic wave transmission element includes a through hole. The through hole is disposed correspondingly to the gas nozzle assembly hole for the gas nozzle assembly member to penetrate.

In one embodiment, the sensor body further includes a support member. The support member is disposed at a surface of the sensor body facing the tire rim, and abuts against the tire rim.

In the present invention, the update connection port electrically connected to the tire pressure sensing module is disposed on the sensor body. Thus, a user is allowed to directly transmit the updated firmware data via the update connection port to the tire pressure sensing module. With the capability of firmware update, the present invention is capable of adapting different vehicle models and has a greater application range. Further, the sensor body need not be disassembled during updating the firmware, so that the air tightness of the present invention can be maintained as the tire pressure sensor is first assembled. Therefore, consumers may replace numerous conventional tire pressure detectors by the tire pressure sensor of the present invention. Since firmware of the present invention can be written into the tire pressure sensor at all times after assembling the tire pressure sensor, manufacturers may not only reduce production costs but also achieve maximum benefits as production design details can be adjusted in time according to market demands.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
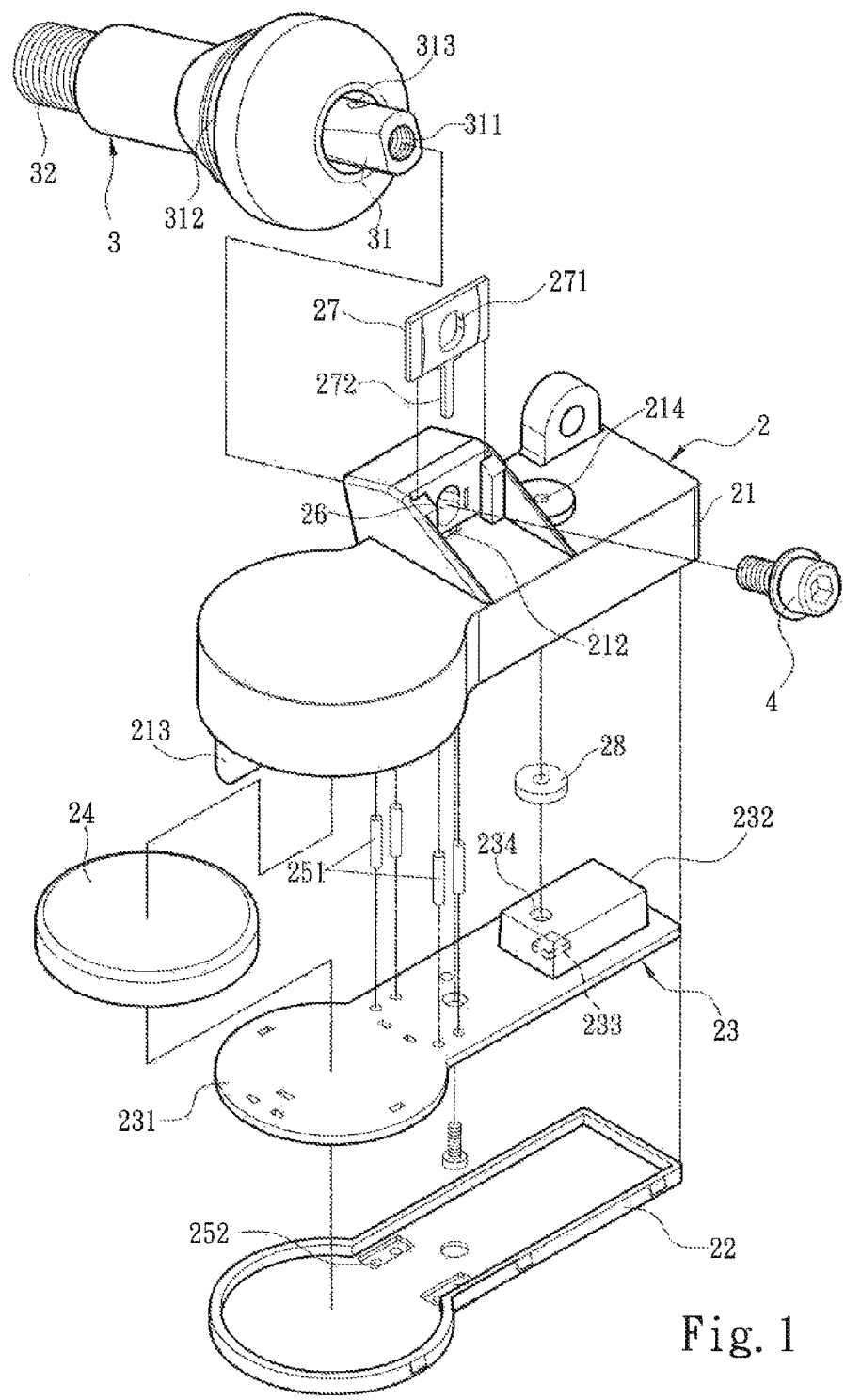
FIG. 1 is an exploded view of a tire pressure sensor of the present invention.
Figure 2:
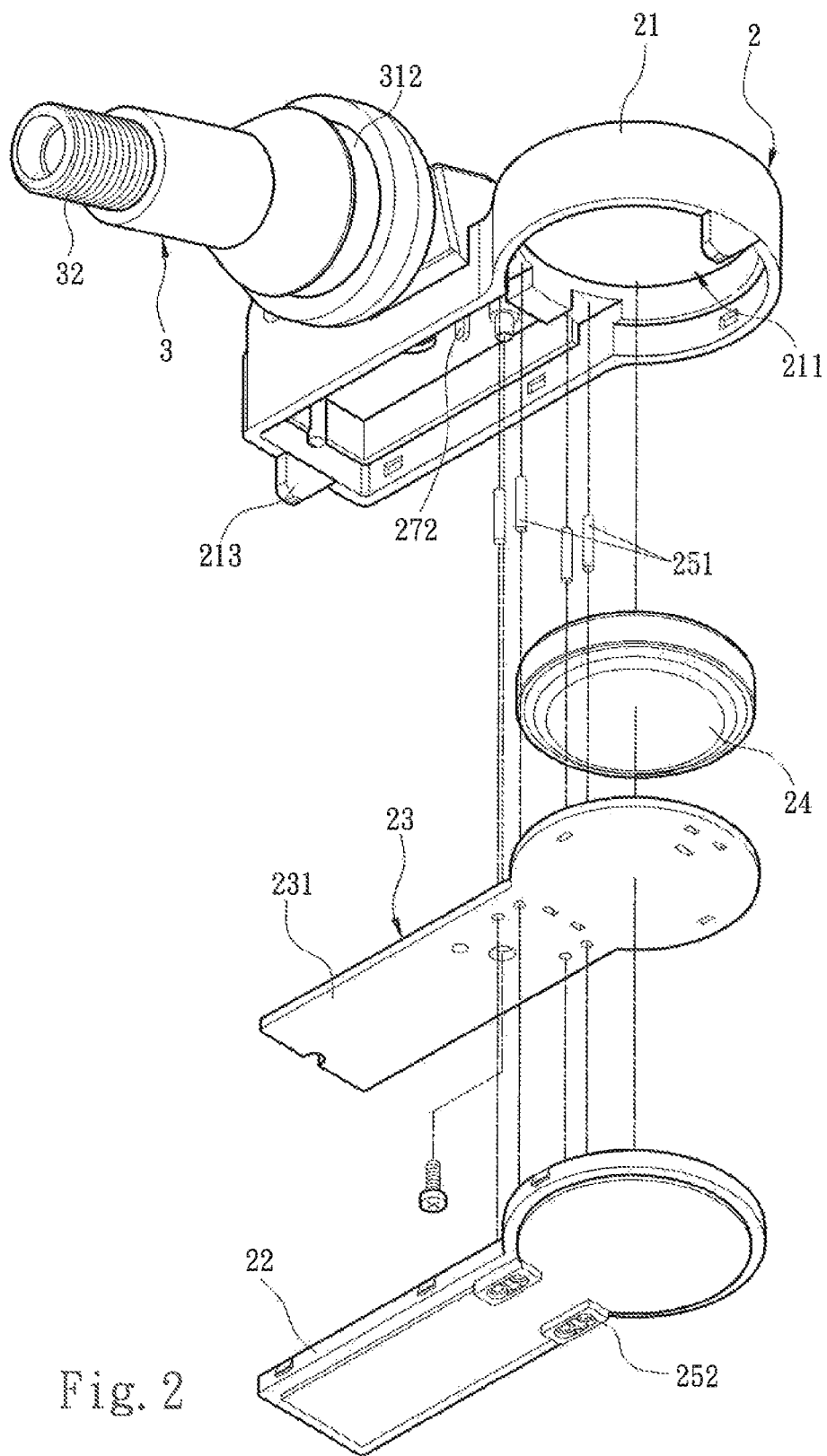
FIG. 2 is an exploded view from another angle of the tire pressure sensor of the present invention.
Figure 4:
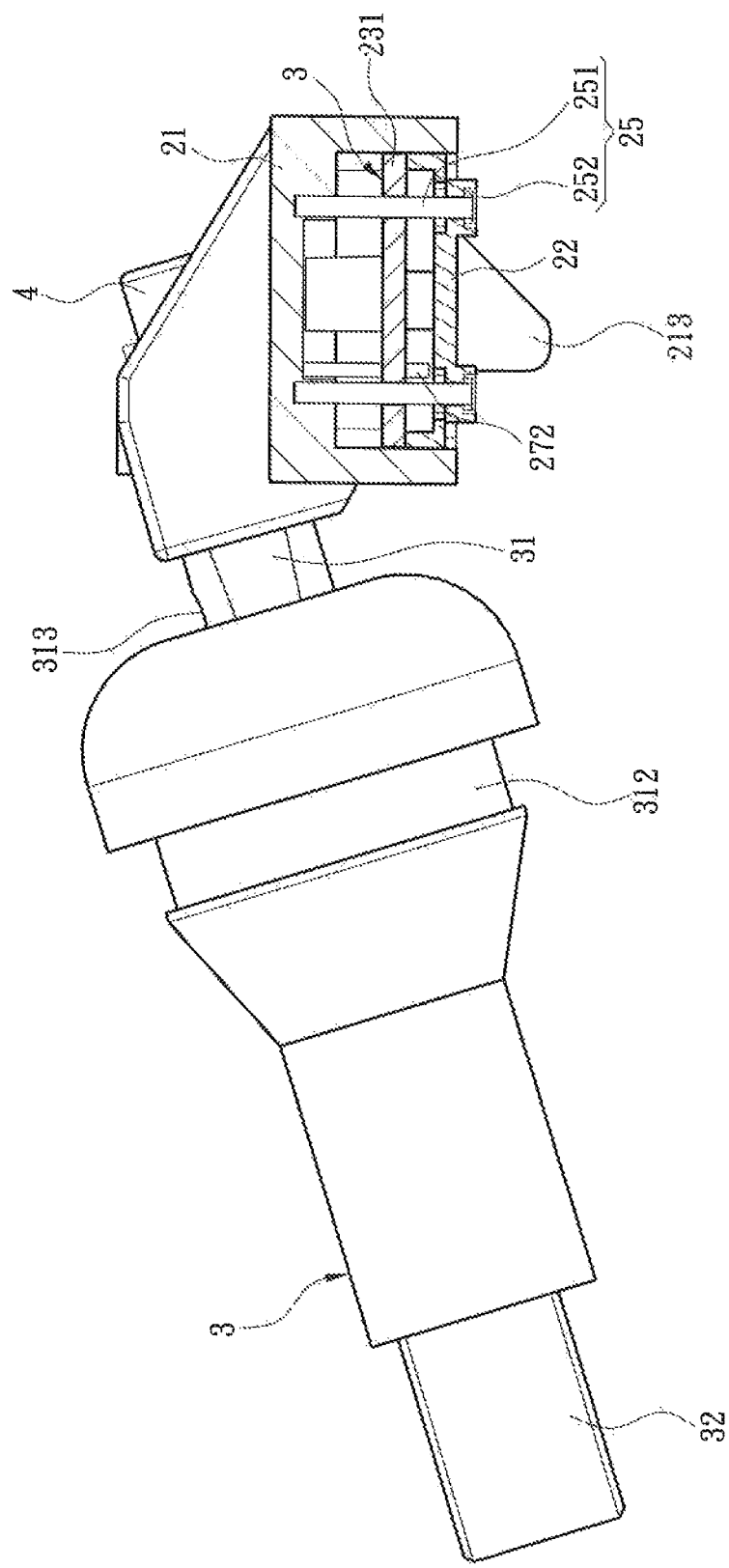
FIG. 4 is a sectional view of an update connection port of the tire pressure sensor of the present invention.
Figure 5:
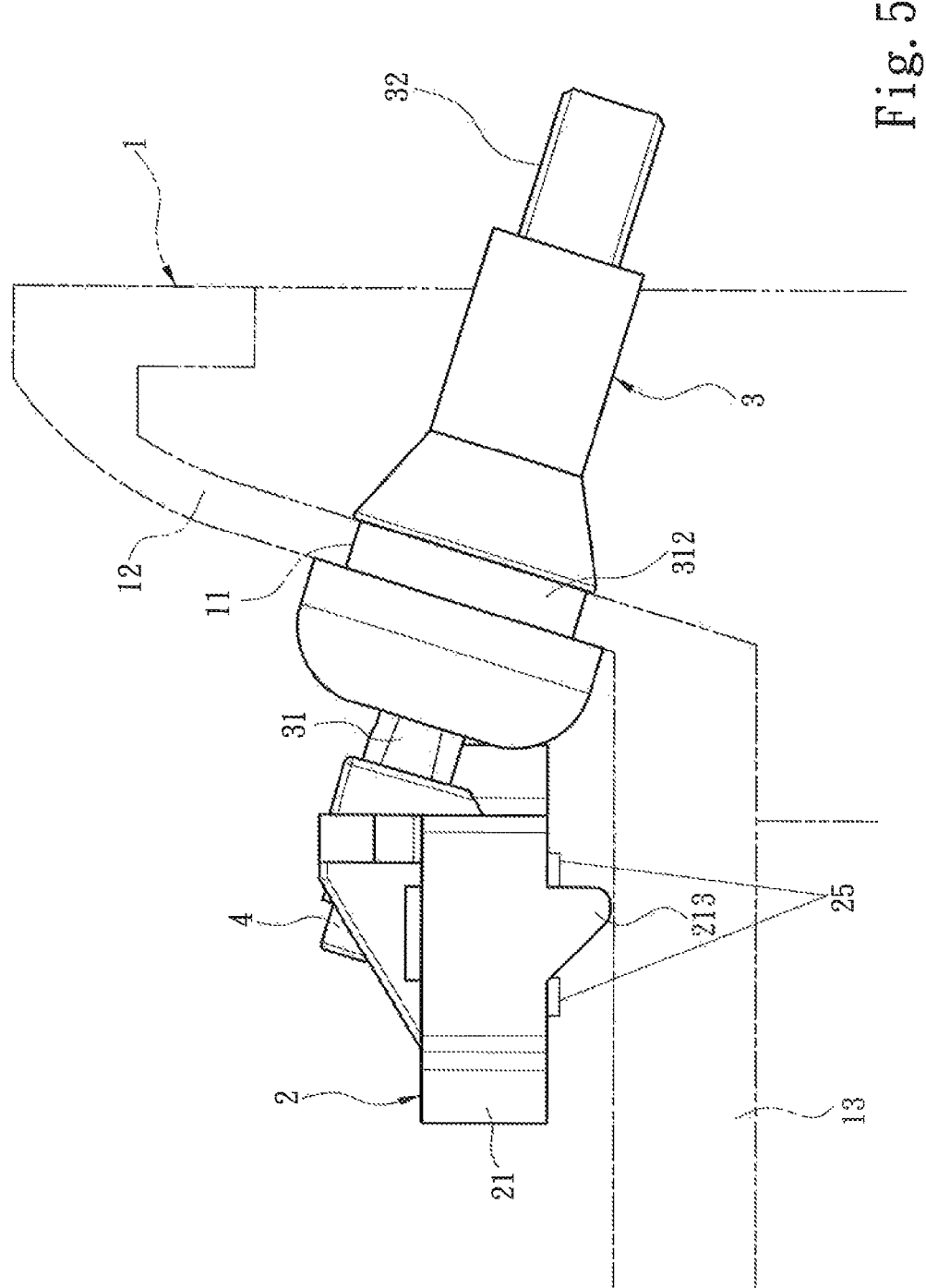
FIG. 5 is a schematic view of using the tire pressure sensor of the present invention.

FIGS. 1, 2 and 5 are an exploded view, an exploded view from another angle, and a schematic view of using the tire pressure sensor of the present invention. As shown, a tire pressure sensor of the present invention may be installed on a tire rim 1 of tire (not shown). The tire rim 1 includes two folded section 12 at two sides thereof to engage with a tire body (not shown), a connecting section 13 connecting the two folded sections 12, and an assembly through hole 11 disposed between one of the folded sections 12 and the connecting section 13. The tire pressure sensor includes a sensor body 2, a gas intake nozzle 3 connected to the sensor body 2, and a gas nozzle assembly member 4 to couple with the sensor body 2 and the gas intake nozzle 3. The sensor body 2 includes a tire pressure sensing module 23 disposed in the sensor body 2, at least one battery 24 providing power for the tire pressure sensing module 23, an update connection port 25 electrically connected to the tire pressure sensing module 23 (also referring to FIG. 4), and a gas nozzle assembly hole 26 disposed on the sensor body 2. The tire pressure sensing module 23 includes a circuit board 231 and a control unit 232 disposed on the circuit board 231. The control unit 232 includes a sensing unit 233, and stores a firmware therein. The firmware controls operations of the tire pressure sensing module 23, and has a predetermined condition. More specifically, the predetermined condition is information (to be referred to as a safe range) such as most appropriate tire temperatures and tire pressures in normal condition of a vehicle model on which the sensor body is installed. Further, the control unit 232 includes a sensing region 234 connected to the sensing element 233, and the sensor body 2 includes a gas intake portion 214 and a washer 28. The gas intake portion 214 is disposed correspondingly to the sensing region 234. The washer 28 is disposed correspondingly to positions of the gas intake portion 214 and the sensing region 234, and is clamped between the sensor body 2 and the tire pressure sensing module 23. During an operation of the tire pressure sensing module 23, gas in the tire enters the sensor body 2 through the gas intake portion 214, and is restricted by the washer 28 to directly reach the sensing region 234. Thus, the sensing unit 233 detects data such as the tire temperature and tire pressure of the tire through the sensing region 234, correspondingly generates a tire condition information, and transmits the tire condition information to the control unit 232. The control unit 232 compares the tire condition information with the predetermined condition stored in the firmware to determine whether a tire condition is abnormal. If the tire condition is abnormal, an alert signal is generated, and then the tire condition information and the alert signal are transmitted to a monitoring device (not shown) via wireless transmission. The monitoring system may be installed near a driver seat for a driver to easily observe, or may be incorporated into a vehicle computer and directly displayed on a dashboard of a vehicle, so as to allow a driver to learn whether the tire condition is abnormal in time. Further, the manufacturer may write firmware having different predetermined conditions according to safe operating ranges of different vehicle models. As such, when the tire pressure sensor is to be applied to a different vehicle model, the tire pressure sensor of the present invention is capable of adapting requirements of the different vehicle model by updating the firmware. For example, when a tire pressure sensor originally utilized in a sedan is to be installed to a truck, the tire pressure sensor may be disassembled from a tire rim of the sedan, followed by updating the firmware of the tire pressure sensor to change the original firmware suitable for the sedan to firmware suitable for the truck. The tire pressure sensor with the updated firmware may then be installed onto a tire rim of the truck. At this time, the tire pressure sensor has contained information of standard conditions of the truck, and thus satisfies requirements of the truck.

Figure 3:
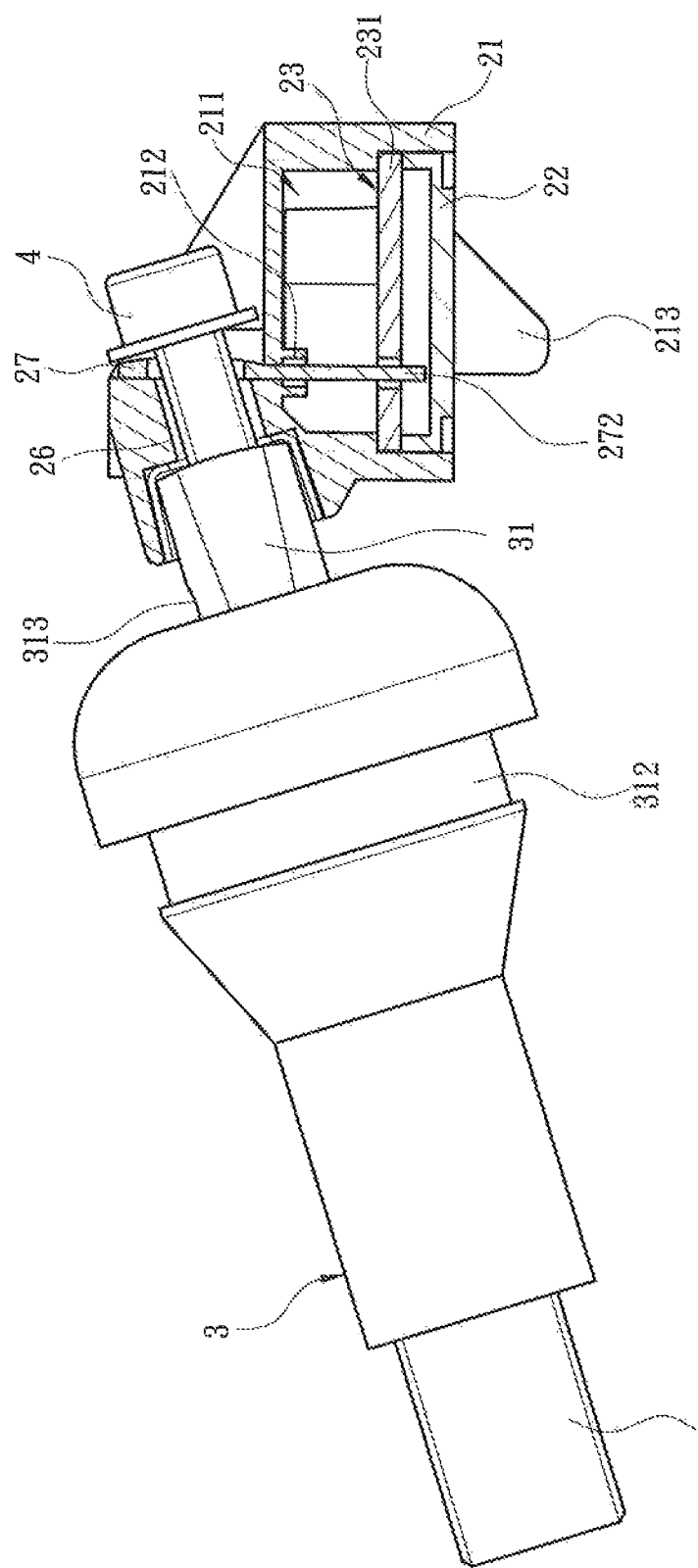
FIG. 3 is a sectional view of a gas intake nozzle of the tire pressure sensor of the present invention.

In the above embodiment, the sensor body 2 is a single housing. In a preferred embodiment of the present invention, the sensor body 2 comprises a first housing 21, and a second housing 22 that can be engaged with the first housing 21. The first housing 21 comprises an accommodating chamber 211, with an opening facing the connecting section 13 of the tire rim 1, for accommodating the tire pressure sensing module 23 (as shown in FIGS. 2 and 3). By engaging the second housing 22 with the first housing 21, the accommodating chamber 211 is covered by the second housing 22 to form an enclosed space that retains the tire pressure sensing module 23 and the battery 24 therein. To ensure the accommodating chamber 211 is in a completely airtight state when the second housing 22 is engaged with the first housing 21, an adhesive (not shown) may further be applied to contact parts of the second housing 22 and the first housing 21. As such, dust generated from frictions of the tire or moisture is prevented from entering the accommodating chamber 211 as well as from affecting the durability of the tire sensing module 23. Further, on the sensor body 2, the gas nozzle assembly hole 26 is disposed on a surface of the first housing 21 opposite to the opening of the accommodating chamber 211.

In the present invention, the update connection port 25 and the tire pressure sensing module 23 may be connected to an external electronic device (not shown) to receive an update firmware data. The update connection port 25 may be implemented in various embodiments. In a first embodiment, the update connection port 25 includes at least one terminal (not shown) disposed at the control unit 232 or on the circuit board 231, and at least one perforation 252 disposed on the sensor body 2 and corresponding to the terminal to allow the external electronic device to connect with the terminal via the perforation 252. Alternatively, in a second embodiment, the terminal of the connection port 25 is modified into at least one conducting pin 251 which is electrically connected to the circuit board 231 and inserts into the perforation 252. Taking the sensor body 2 with the single housing for example, the perforation 252 may be disposed on the single housing, and the conducting pin 251 may be disposed in the sensor body 2 to connect the perforation 252 and the circuit board 231. Alternatively, referring to FIGS. 1 and 2 showing preferred embodiments of the present invention, the perforation 252 is disposed on the second housing 22, and the conducting pin 251 disposed in the accommodating chamber 211 by means of in-mold injection, includes one end fixed on the first housing 21 and another end penetrated into the circuit board 231 and extended into the perforation 252. One end of the conducting pin 251 may also be extended into the perforation 252 by manual means, and the conducting pin 251 and the perforation 252 may be fastened to each other by applying an adhesive (not shown) at a contact part of the two. It should be noted that, the two embodiments above do not affect functions of the update connection port 25, and assembled structures of the two embodiments are the same (as shown in FIG. 4). According to a preferred embodiment of the present invention, the perforation 252 is disposed on the second housing 22 for illustrating the present invention, and the present invention is not limited thereto. To update the firmware of the tire pressure sensor of the present invention, the manufacturer may connect the external electronic device to the conducting pin 251, which is extended into the perforation 252 and electrically connected to the circuit board 231, so as to establish a connection with the control unit 232 of the tire pressure sensing module 23 via the conducting pin 251, and to input the update firmware data to update the firmware stored in the control unit 232. With the update connection port 25, the manufacturer is allowed to directly perform firmware update to the tire pressure sensor module 23 via the update connection port 25 without disassembling the sensor body 2. Therefore, an application range of the present invention can be broadened through the simple approach above.

Referring to FIGS. 1 and 3, the gas intake nozzle 3 may be made of a metal material, and includes a coupling section 31 corresponding to the gas nozzle assembly hole 26 and a gas intake section 32 connecting to the coupling section 31. The coupling section 31 includes an assembly hole 311, a positioning groove 312 and an air outlet through hole 313. The assembly hole 311 is disposed facing the gas nozzle assembly hole 26. The positioning groove 312 encircles the coupling section 31 and is engaged with the assembly through hole 11 to fasten the gas intake nozzle 3 onto the tire rim 1. The air outlet through hole 313 is disposed between the assembly hole 311 and the positioning groove 312. Further, the gas nozzle assembly hole 26 is disposed at a surface of the first housing 21 opposite to the opening of the accommodating chamber 211. For assembly, the coupling section 31 is first inserted into the gas nozzle assembly hole 26 to contact the two with each other. The gas nozzle assembly member 4, facing the coupling section 31, penetrates through the gas nozzle assembly hole 26 to couple with the assembly hole 311 of the coupling section 31, so as to steadily connect the gas intake nozzle 3 with the sensor body 2. In the embodiment, the gas nozzle assembly member 4 may be a metal screw, and the assembly hole 311 includes a screw thread corresponding to the screw, but methods for connecting the gas nozzle assembly member 4 and the assembly hole 311 is not limited to the above approach. The gas intake section 32 penetrates through the assembly through hole 11 of the tire rim 1 to extend to the outside the tire rim 1, and is thus capable of receiving gas outputted from an inflation device (not shown). The gas passes through the gas intake nozzle 3 and flows from the air outlet through hole 313 inside the tire rim 1 to complete an inflation process.

As shown in FIG. 1, in a preferred embodiment of the present invention, the sensor body 2 further includes an electromagnetic wave transmission element 27 which may be made of metals. The electromagnetic wave transmission element 27 is disposed on the first housing 21, connected to the gas nozzle assembly hole 26, and includes a through hole 271 corresponding to the gas nozzle assembly hole 26 and a transmission pin 272. Further, the first housing 21 further includes a transmission opening 212 disposed at a bottom part of the accommodating chamber 211 corresponding to a position of the transmission pin 272. The transmission pin 272 may then penetrate through the transmission opening 212 to extend into the accommodating chamber 211 and to further connect to the circuit board 231. As such, the electromagnetic wave transmission element 27 is electrically connected to the tire pressure sensing module 23. Moreover, the gas nozzle assembly member 4 penetrates through the hole 271 of the electromagnetic wave transmission element 27 and the gas nozzle assembly hole 26 to screw and fasten with the assembly hole 311, such that the electromagnetic wave transmission element 27 is clamped between the gas nozzle assembly member 4 and the gas nozzle assembly hole 26 (as shown in FIG. 3). Since the gas nozzle assembly member 4 and the gas intake nozzle 3 may be both made of metals, the tire pressure sensing module 23 may electrically connect to the gas intake nozzle 3 via the electromagnetic wave transmission element 27 and the gas nozzle assembly member 4. Thus, the gas intake nozzle 3 may serve as an antenna for wireless transmission to transmit the tire condition information outputted by the control unit 232 to the monitoring device. As the gas intake section 32 of the gas intake nozzle 3 is exposed to the outside of the tire rim 1 and thus has less obstruction on wireless transmission paths thereof, improved transmission effects may be achieved. Further, an adhesive (not shown) may be applied to a contact part of the transmission opening 212 and the transmission pin 272 to achieve even better sealing effects.

Referring to FIG. 5, the tire pressure sensor of the present invention is installed on the tire rim 1, the gas intake section 32 of the gas intake nozzle 3 is inserted into the assembly through hole 11, and the positioning groove 312 of the coupling section 31 is engaged onto the tire rim 1 to make the gas intake nozzle 31 be steadily fastened on the tire rim 1 at all times. Next, the sensor body 2 is connected to the gas intake nozzle 3, and the gas nozzle assembly member 4 penetrates into the gas nozzle assembly hole 26 to assemble the sensor body 2 with the gas intake nozzle 3. Further, the first housing 21 includes at least one support member 213 disposed on a surface facing the connecting section 13 and extending towards the connecting section 13. Instead of directly touching the connecting section 13 and thus receiving drastic vibrations of the tire rim 1, the sensor body 2 is abutted on the connecting section 13 through the support member 213, thereby preventing part damages caused by the vibrations as well as providing a buffering effect.

In conclusion, in the tire pressure sensor of the present invention, the update connection port which electrically connected to the tire pressure sensing module is disposed on the sensor body. Thus, without disassembling the sensor body while maintaining the air tightness of the tire pressure sensor, a user is allowed to directly transmit the update firmware data to the tire pressure sensing module via the update connection port. As such, the firmware stored in the tire pressure sensing module can be updated to satisfy utilization requirements of applying in different conditions. Therefore, a consumer does not need to purchase several different tire pressure detectors according to different requirements. Further, for a manufacturer, since tire pressure detectors can first be assembled and then written with firmware therein during a manufacturing process, not only production costs are reduced, but also maximum benefits can be achieved as production design details can be adjusted in time according to market demands.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A tire pressure sensor installed on a tire rim, the tire rim comprising an assembly through hole; the tire pressure sensor comprising:
    a sensor body, comprising:
        a gas nozzle assembly hole;
        a tire pressure sensing module disposed in the sensor body for detecting a tire pressure, including a control unit which saves a firmware for controlling operation of the tire pressure sensing module;
        a first housing including an accommodating chamber to accommodate the tire pressure sensing module;
        a second housing engaging with the first housing to enclose the accommodating chamber; and
        an update connection port electrically connecting to the tire pressure sensing module, wherein the control unit receives an update firmware data through the update connection port for updating the firmware, the second housing comprises at least one perforation, and the update connection port comprises at least one conducting pin disposed in the accommodating chamber and corresponding to the perforation to transmit the update firmware data from outside to the control unit and the conducting pin has one end fixed on the first housing and the other end extended into the perforation;
    a gas intake nozzle, comprising:
        a coupling section inserted into the gas nozzle assembly hole; and
        a gas intake section connecting to the coupling section, penetrating through the assembly through hole, and extending towards a direction outside the tire rim for gas to input; and
    a gas nozzle assembly member, penetrating through the gas nozzle assembly hole to couple with the gas intake nozzle.

2. The tire pressure sensor of claim 1, wherein the control unit of the tire pressure sensing module comprises a sensing region; the sensor body comprises a gas intake portion corresponding to the sensing region, and a washer disposed between the gas intake portion and the sensing region.

3. The tire pressure sensor of claim 1, wherein the coupling section further comprises an assembly hole facing the gas nozzle assembly hole to couple with the gas nozzle assembly member, and a positioning groove engaging with the assembly through hole to fasten the gas intake nozzle on the tire rim.

4. The tire pressure sensor of claim 1, wherein the sensor body further comprises an electromagnetic wave transmission element electrically connected to the tire pressure sensing module to output a tire condition information generated by the tire pressure sensing module after detecting the tire pressure.

5. The tire pressure sensor of claim 4, wherein the electromagnetic wave transmission element comprises a through hole corresponding to the gas nozzle assembly hole for the gas nozzle assembly member to penetrate.

6. The tire pressure sensor of claim 1, wherein the sensor body further comprises at least one support member disposed on a surface of the sensor body facing the tire rim and abutting against the tire rim.

* * * * *